B. P. HAYES.
CLAMP AND GUARD FOR METAL SHEARS.
APPLICATION FILED JAN. 11, 1918.
1,330,186.
Patented Feb. 10, 1920.
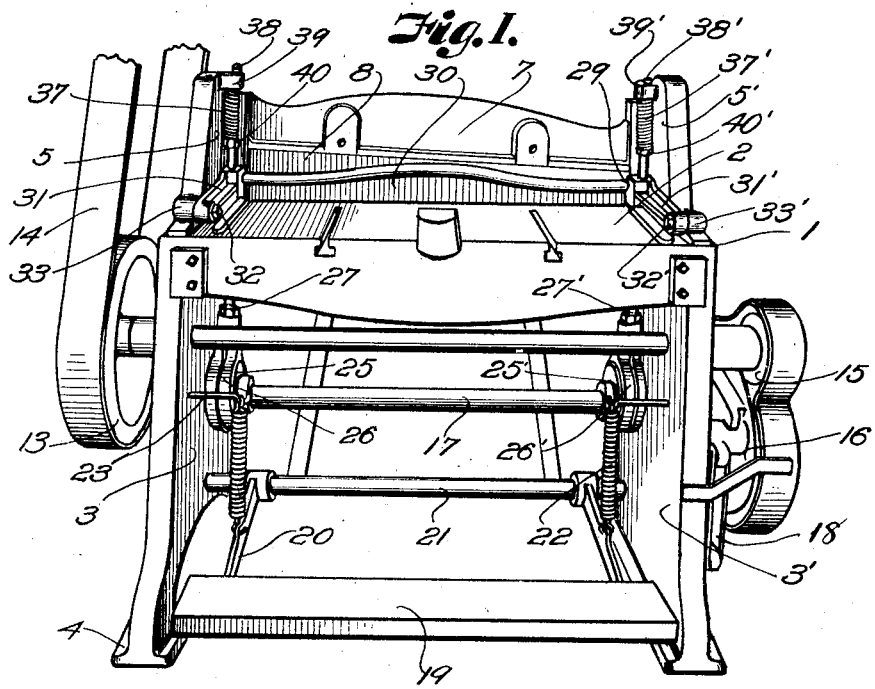
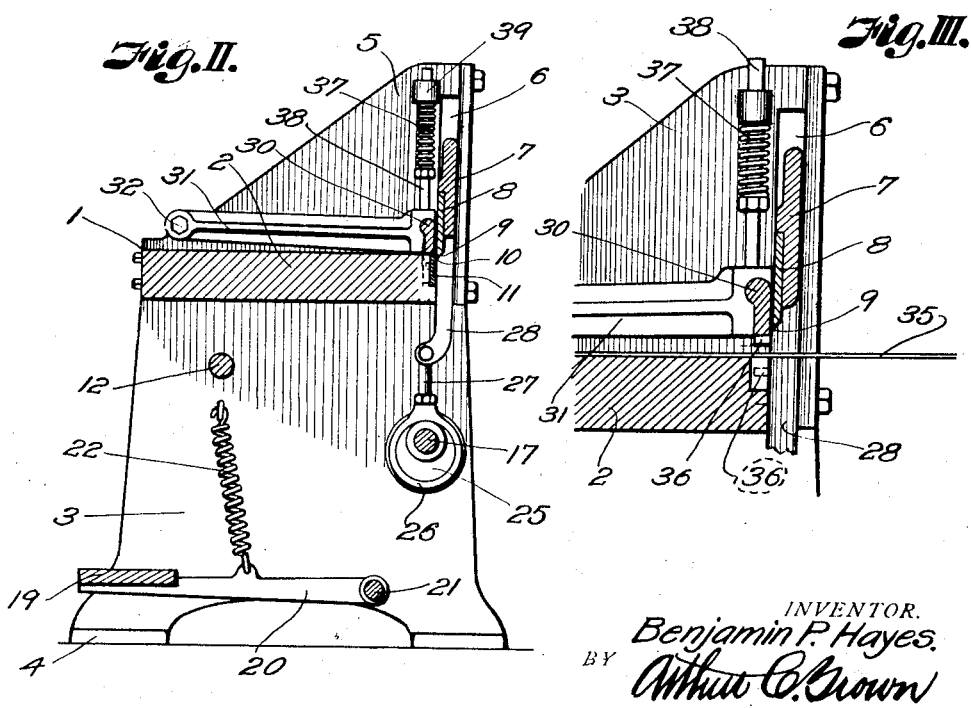
INVENTOR.
Benjamin P. Hayes.
BY
Arthur C. Brown
ATTORNEY

UNITED STATES PATENT OFFICE.

BENJAMIN P. HAYES, OF KANSAS CITY, MISSOURI.

CLAMP AND GUARD FOR METAL-SHEARS.

1,330,186.      Specification of Letters Patent.     Patented Feb. 10, 1920.

Application filed January 11, 1918. Serial No. 211,410.

*To all whom it may concern:*

Be it known that I, BENJAMIN P. HAYES, a citizen of the United States, residing at Kansas City, in the county of Jackson and State of Missouri, have invented certain new and useful Improvements in Clamps and Guards for Metal-Shears; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in metal shears and more particularly to an automatically operable clamping device for retaining a metal sheet rigidly at a set position during a shearing operation; the principal object of the invention being to provide a clamping device of this character whereby a metal sheet being sheared may be securely clamped during a cutting operation and which will be automatically moved, to release the sheet, when the cutting is completed.

It is a further object of the invention to provide a device of this character that will serve as a guard to positively prevent any possible injury, which might be the result of accident or carelessness, to a workman operating the machine, and which moves automatically to and from clamping position under the control of a shear blade and requires no added or special mechanism for controlling its operation.

It is a still further object of the invention to provide such a guard that not only protects the operator of the machine, but also protects the machine by making it impossible to receive metal thicker than that which it is safe to cut therein.

In accomplishing these objects I have provided improved details of structure the preferred forms of which are illustrated in the accompanying drawings, wherein:—

Figure I is a perspective view of a cross-cut metal shearing machine equipped with a clamping device constructed according to the present invention.

Fig. II is a transverse vertical section of the same showing the clamping bar in functional position.

Fig. III is an enlarged sectional view of a part of the machine showing the clamping bar raised.

Referring more in detail to the drawings:—

1 designates a power driven, cross-cut, metal shearing machine whereon a clamping device constructed according to the present invention is applied; the machine here shown comprising the flat working table 2 supported at its opposite ends by walls or frames 3—3' having flanged base portions 4 whereby the machine may be anchored to a floor or other supporting member and held solidly in operating position.

Extending upwardly at opposite ends of the table are standards or frames 5—5', provided at their rear edges with vertical guideways 6 wherein the opposite ends of a horizontal, blade supporting bar 7 are slidably contained; the bar being adapted to move vertically adjacent the rear edge of the table 2 and carrying a blade 8 having a cutting edge 9 adapted to move into or from coöperative engagement with the cutting edge 10 of a similar, oppositely mounted blade 11 fixed to the rear edge of the table 2.

Revolubly mounted in the side frames 3—3' longitudnally beneath the table 2 is a driving shaft 12, one end of which carries a belt wheel 13 over which a driving belt 14 operates to drive the shaft, and at its opposite end is provided with a gear wheel 15, adapted to travel in mesh with a gear wheel 16 mounted on the end of a shaft 17 also revolubly mounted in frames 3—3' beneath the table and parallel with the shaft 12; the gear wheel 16 normally revolves freely on the shaft 17 but may be locked thereto by the shifting of a clutch (not shown) that is actuated by the operation of a clutch shifting mechanism indicated at 18; the said shifting mechanism being actuated by the downward movement of a foot pedal 19 carried at the forward ends of paired arms 20 fixed at their inner ends on a shaft 21 mounted beneath the shaft 17 and revoluble under influence of the pedal to actuate the clutch shifting mechanism.

Disconnection of the clutch mechanism is effected by an upward movement of the foot pedal under the influence of tension springs 22 fixed at their opposite ends respectively to the arms 20 and to brackets 23 extending from the inner faces of the wall 3—3'; the arrangement being such that when the pedal is in raised position the clutch mechanism is in disconnected relation with the gear wheel 16 but when the pedal is depressed the shaft 21 is partially revolved to cause the gear 16 to be locked to the shaft 17 so that the latter will be revolved to effect a cutting operation of the machine.

The means provided for actuating the cutting blade 11 comprises a pair of eccentrics 25—25' that are fixed on the shaft 17 adjacent the inner faces of the side walls 3—3' and which revolve under influence of the shaft 17 within collars 26—26' mounted thereon. Extending upwardly from the collars are standards 27—27' pivotally connected at their upper ends to the lower ends of arms 28 extending downwardly from the opposite ends of the knife bar 7 so that rotation of the shaft 17 will actuate the eccentric to move the bar vertically and the blade 8 into or from shearing contact with the blade 11.

Located adjacent the inner face of the blade 8 is a clamping device and guard 29 embodying the present invention, the same comprising a cross bar 30 that extends parallel with and closely adjacent the inner face of the blade 8 and is rigidly held in such a position by arms 31—31' extending forwardly from its opposite ends; the said arms being pivotally attached at their outer ends at a point about midway between the limits of the arc upon which the clamping device swings, by bolts or pins 32—32' to bearing members 33—33' fixed adjacent the forward edge and at the ends of the table 2 so that the clamping bar may move toward or away from the table to effect a clamping engagement or the release of a metal sheet that may be located on the table.

Except at a time when a cutting operation is taking place the cutting edge of the blade 8 is raised above the level of the table 2 that a sheet of metal 35 may be moved between the cutting edges of the blades. The clamping bar 30 is likewise raised and is held sufficiently from the table, that it will not interfere with the placing of the metal sheet, by means of studs 36 that project outwardly from the arms 28 at opposite sides of the machine and engage the under edges of the clamping bar and move downwardly with the blade to release the clamp bar so that it will take effect just before the shearing operation.

It is apparent that the studs 36 may be so located that the rise of the bar 30 will be sufficient to receive stock not over a certain thickness and all above the predetermined thickness will be rejected, thereby protecting the machine from possible damage that might result from cutting stock of a greater thickness than that for which the machine was designed.

The clamping of the metal plate being sheared is effected by clamping the same between the lower edge of the bar 30 and the upper face of the table 2 and the bar is yieldingly urged to clamping position as the blade moves downwardly by a pair of coil springs 37—37' mounted on guide rods 38—38' extending upwardly from the opposite ends of the bar 30 and slidable at their upper ends in guide bearings 39—39' formed at the upper ends of the side frames 5—5'; the said springs bearing at their upper ends against the guide bearings and at their lower ends against nuts 40—40' that are threaded on the rods 38—38' so that the tension of the springs may be adjusted. Assuming that the device is so constructed and applied to a shearing machine as described, in using the machine the knife 8 is normally located above the level of the cutting blade 11 and table 2 so that a metal sheet 35 may be moved between the blades, and the clamping bar 30 is retained sufficiently above the table by the lifting contact of the studs 36, that it will not interfere with a proper positioning of a sheet of metal below a certain thickness.

After the sheet of metal to be sheared is properly located, the operator of the machine presses downwardly on the foot pedal 19 which partially revolves the shaft 21 and actuates the clutch mechanism to lock the shaft 17 and gear wheel 16 so that the shaft will be revolved and the eccentrics 25—25' moved thereby to effect a downward movement of the blade 8 into shearing contact with the blade 11, to sever the sheet.

It is apparent that as the blade bar 7 moves downwardly the clamping bar 30 which is supported against the pressure of the springs 37—37' by the studs 36 is likewise lowered into clamping engagement with the plate to be sheared; the studs being so located that the clamping bar takes effect just before the shearing operation, and the springs are made sufficiently strong that the plate is substantially held against any possible slipping or displacement until the shearing is completed.

As the shear blade is again raised to open position, the studs contact the lower edge of the clamp bar and raise the latter against the pressure of the springs to free the clamped portion of the plate and the latter may be removed from or reset in the machine.

It is apparent that with the device so arranged, an effective clamping means is provided and that the same operates automatically under the control of the shear blade without the addition of any special operating levers, and serves not only as a clamping device but also as a guard for saving an operator from accidental injury by placing his hand too far within the machine and for preventing the insertion of undesirable stock to the cutting blades.

It is apparent that by using springs of different strength, a desired clamping pressure may be obtained and by a proper location of the lifting studs 36 on the arms of the bar 7 the clamping bar 30 may be raised at the proper time and a distance sufficient to permit placement of the metal sheet but not sufficient to permit injury to an operator.

Having thus described my invention what I claim as new therein and desire to secure by Letters-Patent is:—

In a machine comprising a supporting table and a movable blade for shearing metal plates, a clamping device pivotally mounted on the table, the pivot being above the table about midway between the limits of the arc upon which the clamping device swings, the clamping device being movable into and from clamping position under the control of the blade to clamp the plate to be sheared to the table during the shearing operation, the position of the pivot point insuring a clamping force upon the blade substantially at right angles to the table.

In testimony whereof I affix my signature.

BENJAMIN P. HAYES.